(12) United States Patent
Onaka et al.

(10) Patent No.: US 6,240,993 B1
(45) Date of Patent: Jun. 5, 2001

(54) METHOD AND APPARATUS FOR PRODUCING A POWER TRANSMISSION BELT

(75) Inventors: Yoshiaki Onaka, Hyogo; Takehiko Ito, Kakogawa; Toshihiro Ueda, Iwakura; Yuji Yamamoto, Hyogo, all of (JP)

(73) Assignee: Mitsuboshi Belting Ltd., Hyogo (JP)

( * ) Notice: Subject to any disclaimer, the term of this patent is extended or adjusted under 35 U.S.C. 154(b) by 0 days.

(21) Appl. No.: 09/234,665

(22) Filed: Jan. 18, 1999

Related U.S. Application Data

(62) Division of application No. 08/837,654, filed on Apr. 22, 1997, now Pat. No. 5,888,330.

(30) Foreign Application Priority Data

Apr. 23, 1996 (JP) .................................................. 8-127743

(51) Int. Cl.[7] ............................ B29C 33/14; B29C 33/42
(52) U.S. Cl. ........................ 156/500; 425/28.1; 425/34.2
(58) Field of Search .................................... 156/138, 140, 156/141, 500; 425/28.1, 34.2; 264/257

(56) References Cited

U.S. PATENT DOCUMENTS 3,068,710 * 12/1962 Beckadolph et al. .
3,897,291 * 7/1975 Hoback et al. .
4,510,113 * 4/1985 Takano et al. ........................ 264/257

* cited by examiner

Primary Examiner—Sam Chuan Yao
(74) Attorney, Agent, or Firm—Wood, Phillips, VanSanten, Clark & Mortimer

(57) ABSTRACT

A method of making a power transmission belt/belt sleeve, which method includes the step of providing a first mold assembly having a central axis and a circumference, providing a sheet material having first and second oppositely facing surfaces, placing the sheet material around the first mold assembly and causing a contoured portion of the first surface to be keyed to the first mold assembly so that the sheet material is in a predetermined circumferential position relative to the first mold assembly, providing a second mold assembly having a contoured surface, placing the contoured surface of the second mold assembly against the second surface of the sheet material, providing a guide element, operatively connecting the guide element between the first and second mold assemblies so that the guide element maintains the second mold assembly in a predetermined circumferential position relative to the first mold assembly, and forming the second surface of the sheet material through the contoured surface of the second mold assembly with the first and second mold assemblies and sheet material in an operative relationship. The contoured portion of the first surface of the sheet material can be pre-formed or formed in place on the first mold assembly.

16 Claims, 3 Drawing Sheets

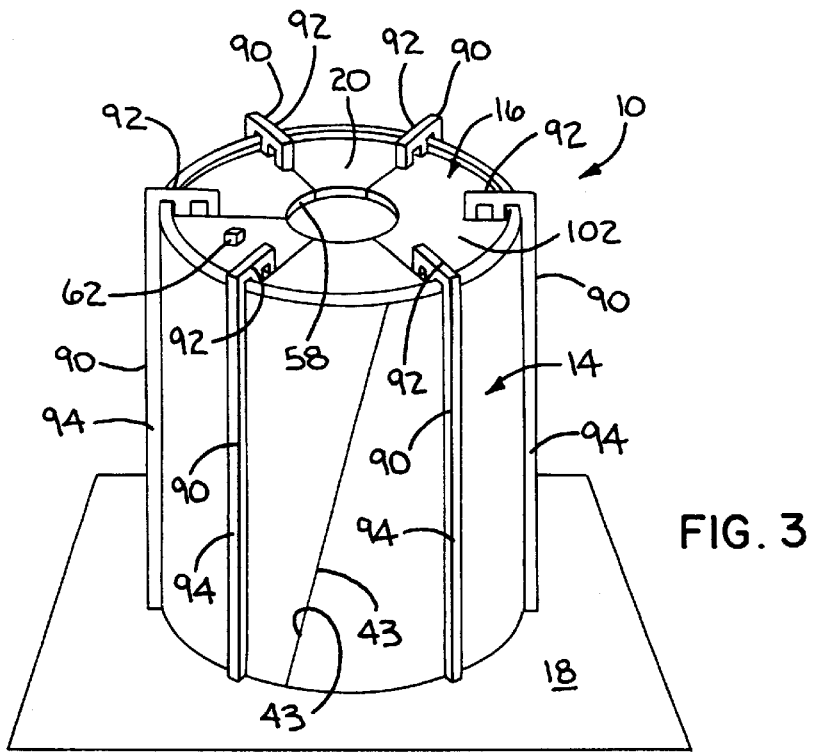
FIG. 3
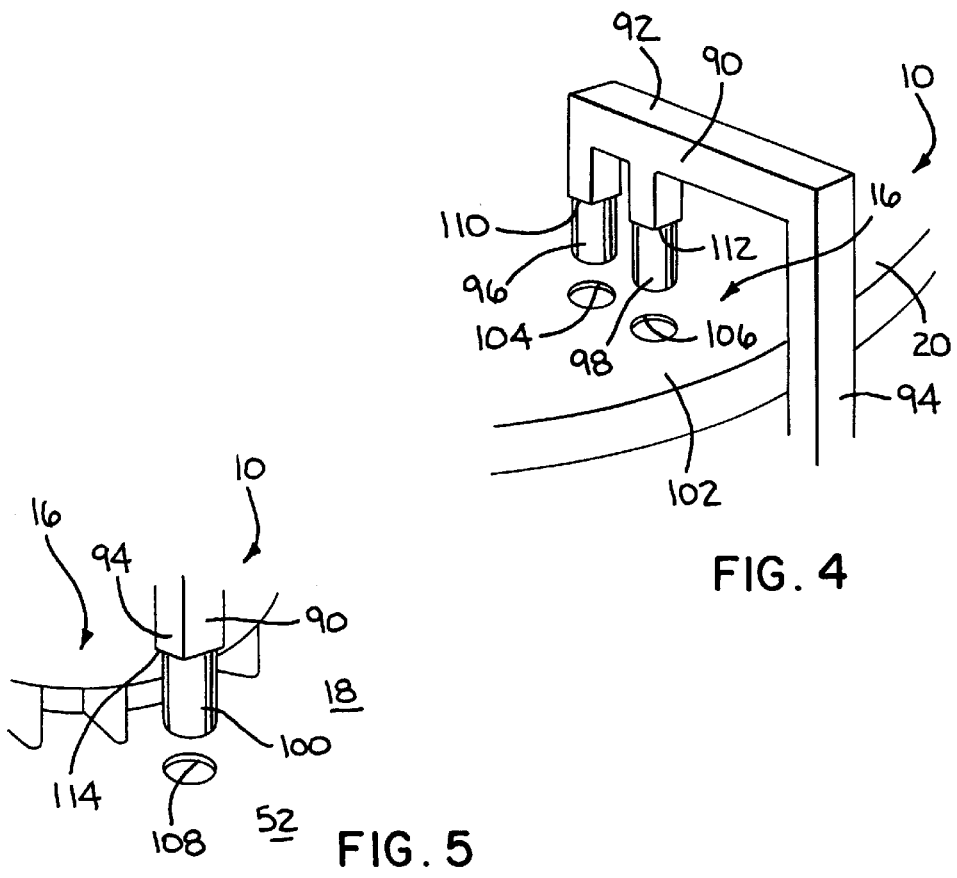
FIG. 4
FIG. 5

METHOD AND APPARATUS FOR PRODUCING A POWER TRANSMISSION BELT

This is a division of application Ser. No. 08/837,654 filed Apr. 22, 1997, now U.S. Pat. No. 5,888,330.

BACKGROUND OF THE INVENTION

1. Field of the Invention

This invention relates to power transmission belts and, more particularly, to a method and apparatus for producing a power transmission belt having cogs/teeth on opposite sides thereof.

2. Background Art

There are two methods commonly practiced to form raw-edge, double-cogged belts; a pre-form method and a spun cog method.

In the pre-form method, a sheet material made up of at least a reinforcing fabric and an unvulcanized rubber layer is placed against a flat mold having alternating grooves and projections on the surface thereof. The sheet material is pressed against the mold surface to cause a complementary groove and projection pattern to be formed on the sheet material. The resulting product is commonly referred to as a "cog pad". The cog pad is then fitted around a cylindrical inner mother die that is part of an inner mold assembly. The butt ends of the cog pad are joined to form an endless sleeve around the inner mother die. Load carrying cords are then spirally wound around the sleeve followed by uncontoured canvas fabric and unvulcanized rubber sheet layers. This entire assembly is then fit within a cylindrical outer mother die/mold assembly having alternating grooves and projections forming cogs on its radially inwardly facing surface. The outer mother die is used to form cogs on the outer surface of the sleeve, which is then vulcanized. This method is capable of producing accurate cogs by reason of the preforming of the sheet material. However, because of the pre-forming step, this method may be relatively expensive to practice.

In the spun cog method, an uncontoured reinforcing fabric and unvulcanized rubber sheet are wound around a cylindrical inner mother die/mold assembly having a cog pattern defined by alternating grooves and projections. The inner mother die is disposed on a support. Load carrying cords are wound spirally around the fabric and rubber sheet under high tension. Thereafter, another uncontoured reinforcing fabric layer and uncontoured unvulcanized rubber layer are wound therearound. The inner mother die with the various layers built up thereon is then fitted within a cylindrical outer mother die having alternating grooves and projections defining a cog pattern. The built up layers on the inner mother die are shaped into a sleeve with a cog-like pattern on oppositely facing surfaces. This sleeve is then vulcanized.

While the spun cog method can be performed relatively inexpensively, often an inaccurate cog formation results by reason of the reinforcing fabrics and unvulcanized rubber sheets not being preformed. Accurate cog formation requires winding of the load carrying cords under tension that is high enough to cause the unvulcanized rubber sheet to fully penetrate into the grooves of the inner mother die.

In both of the above methods, the alignment between the teeth/cogs on the oppositely facing surfaces of the sleeve depends upon the accurate alignment of the inner and outer mother dies, as dictated by the belt specification. A common problem is a misalignment between the dies, resulting in misalignment of the teeth/cogs on the oppositely facing sleeve surfaces.

This is particularly a problem in environments such as driving mechanisms on snowmobiles and the like using variable speed belts. These belts are required to have high side pressure resistance and good flexibility for long belt life. Precise, predetermined positioning between the inner and outer cogs in such environments is critical.

SUMMARY OF THE INVENTION

In one form, the invention contemplates a method of making a power transmission belt/belt sleeve, which method includes the step of providing a first mold assembly having a central axis and a circumference, providing a sheet material having first and second oppositely facing surfaces, placing the sheet material around the first mold assembly and causing a contoured portion of the first surface to be keyed to the first mold assembly so that the sheet material is in a predetermined circumferential position relative to the first mold assembly, providing a second mold assembly having a contoured surface, placing the contoured surface of the second mold assembly against the second surface of the sheet material, providing a guide element, operatively connecting the guide element between the first and second mold assemblies so that the guide element maintains the second mold assembly in a predetermined circumferential position relative to the first mold assembly, and forming the second surface of the sheet material through the contoured surface of the second mold assembly with the first and second mold assemblies and sheet material in an operative relationship. The contoured portion of the first surface of the sheet material can be preformed or formed in place on the first mold assembly.

Using the inventive method, the mold assemblies can be accurately positioned relative to each other to cause the teeth/cogs formed thereby on the opposite surfaces of the sheet material to be consistently aligned in a predetermined relative position.

The first mold assembly may have grooves and projections alternating around the circumference thereof. A contoured portion of the first surface of the sheet material may likewise have grooves and projections that are complementary to the grooves and projections on the first mold assembly. By placing the sheet material around the first mold assembly, the grooves and projections on the first mold assembly and first surface of the sheet material can be meshed.

The sheet material may have first and second spaced, butt ends. The sheet material can be placed around the mold assembly by wrapping the sheet material around the first mold assembly and joining the butt ends to each other to maintain the sheet material in a cylindrical shape on the first mold assembly.

The sheet material may have a body with at least one rubber layer and an elongate load carrying cord embedded in the body and extending around the central axis of the first mold assembly with the sheet material placed around the first mold assembly.

The second mold assembly may have alternating grooves and projections defining the contoured surface of the second mold assembly.

The second mold assembly may be formed to define a continuous cylindrical shape.

The guide element may be separated from the second mold assembly before forming the second surface of the sheet material.

The guide element may be operatively connected by directing a part of the guide element into one of the grooves on the second mold assembly.

The part of the guide element can be repositioned so that the guide element part does not reside in the one groove with the first and second mold assemblies and sheet material in the operative relationship. The sheet material may be vulcanized after the part of the guide element has been repositioned.

The method may further include the step of cutting the sheet material to define a plurality of endless belts.

The invention also contemplates the combination of: a first mold assembly having a central axis, a circumference, and a plurality of keying elements; a sheet material having first and second oppositely facing surfaces with a plurality of alternating grooves and projections on each of the first and second oppositely facing surfaces of the sheet material, wherein with the sheet material and first mold assembly in operative relationship the sheet material extends around the first mold assembly and the keying elements and grooves and projections on the sheet material cooperate to maintain the sheet material and first mold assembly in a predetermined circumferential position relative to each other; a second mold assembly having a surface with a plurality of alternating grooves and projections thereon; and a guide element operatively connecting between the first and second mold assemblies to maintain the first and second mold assemblies in a predetermined circumferential position relative to each other.

The keying elements may be defined by alternating grooves and projections.

In one form, the grooves and projections on the first and second mold assemblies and sheet material extend substantially the full axial extent of the sheet material.

The guide element may be fixed against circumferential movement relative to the first mold assembly and repositionable between a) a first position wherein a part of the guide element resides in one of the grooves in the second mold assembly and b) a second position wherein the part of the guide element does not reside within the one groove.

The sheet material may have a body defined by at least one rubber layer and an elongate load carrying cord embedded in the body.

A plurality of guide elements may be provided each operatively connecting between the first and second mold assemblies to maintain the first and second mold assemblies in the predetermined circumferential position relative to each other. A first one of the guide elements may be selectively separable from each of the first and second mold assemblies.

In one form, the first mold assembly has a base with a first wall having a first upwardly facing surface and a cylindrical body with a second wall with a second upwardly facing surface above the first upwardly facing surface. A main projection is provided on one of the base and cylindrical body with a receptacle for the main projection on the other of the base and cylindrical body. The guide element is engaged with each of the first and second walls.

A first positioning projection may be provided on one of the first wall and the guide element with a first receptacle for the first positioning projection being provided on the other of the first wall and the guide element. A second positioning projection can be provided on one of the second wall and the guide element with a second receptacle for the second positioning projection being provided on one of the second wall and the guide element. The first and second positioning projections are extendable into the first and second receptacles as an incident of the guide element being moved axially with respect to the central axis relative to the first mold assembly.

Projections can be provided on each of the base and cylindrical body which are offset radially from the central axis and cooperate with each other to maintain the base and cylindrical body in a predetermined relative position.

The grooves in the second mold assembly may extend substantially parallel to the central axis, with the guide element having an elongate part that projects axially relative to the central axis within one of the grooves in the second mold assembly.

A plurality of guide elements can be operatively connected between the first and second mold assemblies to maintain the first and second mold assemblies in a predetermined circumferential position relative to each other.

A third positioning projection can be provided on one of the second wall and the guide element, with a third receptacle for the third projecting receptacle being provided on one of the second wall and the guide element.

In one form, the guide element has an L-shaped body with a horizontal leg and a vertical leg, with the first and third projections being on the horizontal leg and the second projection being in the vertical leg.

A plurality of receptacles may be provided on the base and cylindrical body for receiving the first, second and third projections with the guide element in each of a plurality of different positions relative to the first mold assembly.

The grooves in the second mold element may extend substantially parallel to the central axis, with the vertical leg of the guide element residing within one of the grooves in the second mold assembly.

BRIEF DESCRIPTION OF THE DRAWINGS

FIG. 3 is a reduced, perspective view of the inner mold assembly in FIGS. 1 and 2 with guide elements, according to the present invention, operatively connected to the inner mold assembly;

FIG. 4 is an enlarged, exploded, fragmentary, perspective view of a connection between the top portion of one of the inventive guide elements and the inner mold assembly;

FIG. 5 is a view as in FIG. 4 at the bottom of the guide element;

DETAILED DESCRIPTION OF THE DRAWINGS

Figure 7:
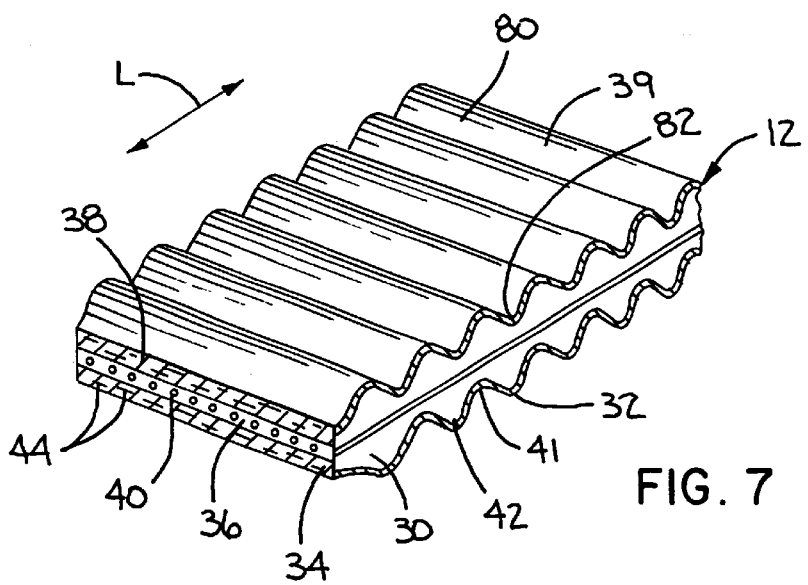
FIG. 7 is an enlarged, fragmentary, perspective view of a power transmission belt made using the inventive structure in FIGS. 1–6.

In FIGS. 1–6, a system, according to the present invention, is shown at 10 for producing a double-cogged/toothed power transmission belt, as shown at 12 in FIG. 7.

According to the invention, a sheet material 14 is placed around a first/inner mold assembly 16. The inner mold assembly 16 consists of a base 18 and a cylindrical body 20 having a central axis 22 and a peripheral surface 24 having alternating, keying grooves 26 and projections 28 that are complementary to a desired cog/tooth configuration for the power transmission belt 12. The grooves 26 and projections 28 have lengths extending parallel to the central axis 22 over substantially the full vertical extent of the cylindrical body 20 on the inner mold assembly 16.

The sheet material 14, and belt 12 formed therefrom, have a body 30 made up of a reinforcing fabric layer 32, an unvulcanized rubber layer 34, an unvulcanized cushion rubber layer 36, an unvulcanized rubber layer 38 overlying the cushion rubber layer 36, and a fabric layer 39 overlying the layer 38. Load carrying cords 40 are embedded in the cushion rubber layer 36 and wrap around the central axis 22.

The components defining the sheet material 14 can be applied to the inner mold assembly 16 in an uncontoured state. Alternatively, some or all of the components defining the sheet material 14 can be preformed by pressing the same against a flat mold (not shown) having grooves and projections alternating along the forming surface thereof to define a "cog pad". While the grooves 26 and projections 28 are shown to be formed on the body 20 of the inner mold assembly 16, a separately formed mold element (not shown) with grooves and projections thereon can be separately attached to the cylindrical body 20.

One exemplary belt forming operation, according to the invention, will now be described. The inner mold assembly 16 is mounted on a shaping machine (not shown). A cog pad is preformed by combining the fabric layer 32, the rubber layer 34 and the cushion rubber layer 36 and pressing the same against a flat mold to pre-form a first contoured surface of the sheet material 14 consisting of grooves 41 and projections 42 that are complementary to the grooves 26 and projections 28 on the inner mold assembly 16. The cog pad is formed to a predetermined length and is placed around the cylindrical body 20 on the inner mold assembly 16 so that the grooves 41 and projections 42 on the cog pad mesh with the grooves 26 and projections 28 on the inner mold assembly 16 whereby the cog pad is circumferentially keyed to the inner mold assembly 16. The butt ends 43 of the cog pad are conventionally connected to each other so that the cog pad has a cylindrical shape. The load carrying cords 40, which may be made from polyester or aramid fiber, are spirally wound around the cog pad. An additional laminate, made up of one or several sheets of reinforcing fabric 39 and the unvulcanized rubber layer 38 are wound over the load carrying cords 40 to complete the sheet material 14 and form a power transmission belt sleeve.

The rubber defining the layers 34, 36, 38 may be any one or a combination of natural rubber, styrene-butadiene rubber, chloroprene rubber, alkylated chlorosulfonated polyethylene rubber, hydrogenated nitrile rubber, mixed polymers of hydrogenated nitrile rubber and metal salts of unsaturated carboxylic acids, etc. Reinforcing fibers 44, made from para-aramid fibers (such as those sold commercially under the trademarks TWARONT™, KEVLAR™ and TECHNORA™), nylon, polyester, vinylon, and cotton can be embedded in the body rubber and oriented in a widthwise direction to provide lateral stability to the belt. Preferably, the short fibers 44 are added from 5 to 40 parts by weight per 100 parts by weight of rubber. Reinforcing fibers 44 can be provided in the cushion rubber layer 36. However, preferably, the cushion rubber layer 36 does not contain such fibers.

The reinforcing fabric 32, 39 may be made from cotton, polyester fiber, nylon, and the like. This may be a woven fabric, a plain fabric, a twill fabric, or satin fabric. The fabric may be a broad-angle canvas fabric in which the warp and weft intersect each other at an angle of from approximately 90 to 120°. The fabric layers 32, 39 may be processed with RFL after which they may be coated with a rubber composition to produce a rubber-coated canvas fabric. The RFL may be a liquid prepared by mixing a precondensate of resorcinol and formalin with latex. The latex may include, for example, chloroprene, styrene-butadiene-vinylpyridine ter-copolymer, hydrogenated nitrile, and nitrile-butadiene rubber (NBR).

The cylindrical body 20 of the mold assembly 16 is removed from the molding machine and placed on the base 18. The base 18 has a wall 52 with a main projection 54 extending upwardly from the wall 52. The projection 54 has a tapered upper surface 56 which guides the projection 54 into a receptacle 58 formed in a bottom wall 60 on the cylindrical body 20.

The bottom wall 60 has a positioning projection 62 offset radially from the central axis 22 and residing between radially spaced positioning projections 64, 66 on the base 18. With the cylindrical body 20 in operative relationship with the base 18, the projection 54 resides within the receptacle 58 and the projection 62 resides radially between the projections 64, 66 to consistently radially locate the cylindrical body 20 relative to the base 18. The cylindrical body 20 can be consistently located on the base 18 by simply directing the cylindrical body downwardly so as to simultaneously seat the projection 54 in the receptacle 58 and mesh the projections 62, 64, 66.

According to the invention, a second/outer mold assembly 70 is extended around the sheet material 14 on the first mold assembly 16. The second mold assembly 70 has a body 72 in the form of a cylindrical sleeve with alternating projections 74 and grooves 76 formed on a radially inwardly projecting surface 78 thereof With the inner mold assembly 16, sheet material 14, and outer mold assembly 70 in relative operative relationship, the grooves 26 and projections 28 on the inner mold assembly 16 and the grooves 76 and the projections 74 on the outer mold assembly 70 are in vertical coincidence over the vertical extent of the sheet material 14. It is important that the relative circumferential positions of the inner mold assembly 16 and outer mold assembly 70 be accurately set to cause the ribs 42 and grooves 41 formed on the inside of the belt 12 to be aligned consistently in a predetermined manner with ribs 80 and grooves 82 on the outside of the belt 12.

To accomplish this, L-shaped guide elements 90 are used. The guide elements 90 may be made of metal or synthetic resin and each have a horizontal leg 92 and a vertical leg 94. The horizontal leg 92 has spaced, positioning projections 96, 98 depending therefrom. The vertical leg 94 has at its bottom portion a downwardly directed positioning projection 100. The guide element 90 is movable selectively between a) a first position, wherein the projections 96, 98 reside above a top wall 102 on the cylindrical body 20 and the projection 100 resides above the bottom wall 52 of the cylindrical body 20 and b) a second position wherein the positioning projections 96, 98 project into receptacles 104, 106 formed in the top wall 102 and the positioning projection 100 projects into a receptacle 108 formed in the base 18. Shoulders 110, 112, 114 limit downward movement of the projections 96, 98, 100 into the receptacles 104, 106, 108, consecutively.

The receptacles 104, 106, 108 are strategically radially and circumferentially located so that the vertical leg 94 of an operatively connected guide element 90 resides within one of the grooves 76 in the outer mold assembly 70 with the inner mold assembly 16 and outer mold assembly 70 in a desired relative circumferential position.

The receptacles 104, 106, 108 are located at circumferentially spaced locations around the top wall 102 and base 18 to allow guide elements 90 to be mounted selectively in any of multiple locations to securely and accurately maintain the circumferential relationship between the inner mold assembly 16 and outer mold assembly 70. In each instance, the vertical leg 94 of the guide element 90 is located to move within a groove 76 on the outer mold assembly 70.

Figure 1:
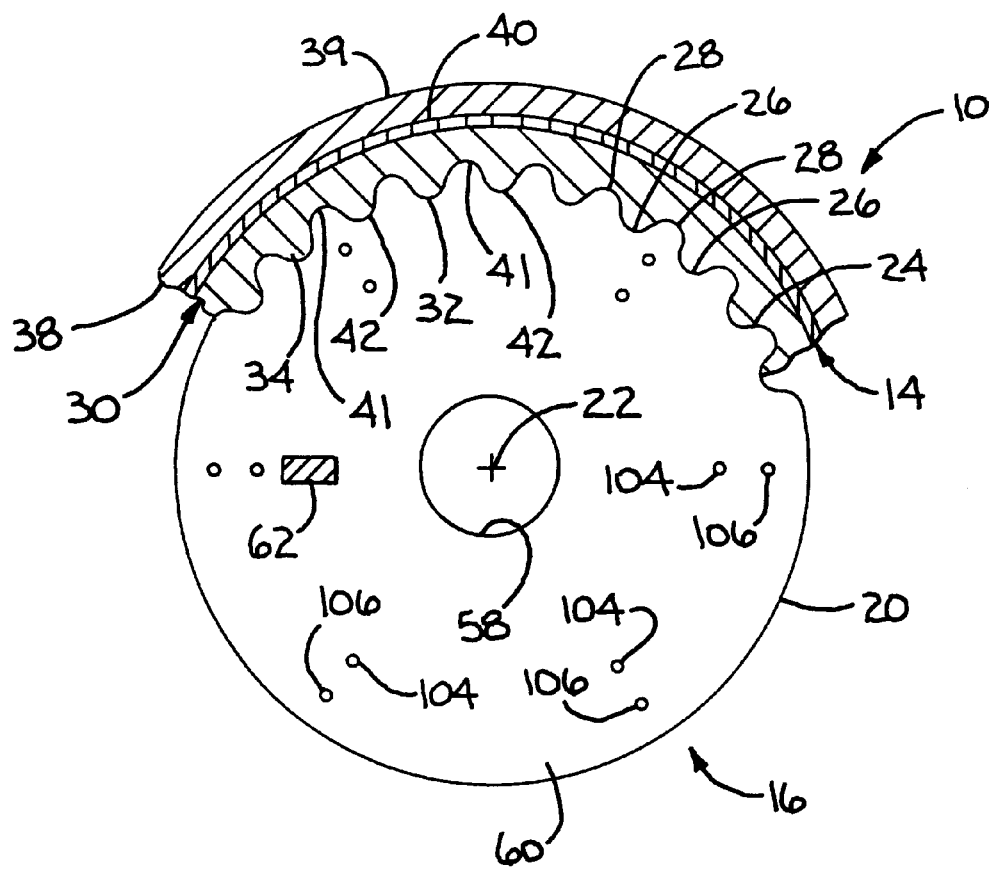
FIG. 1 is a bottom view of a part of an inner mold assembly, according to the present invention, around which a sheet material to be formed is placed.
Figure 2:
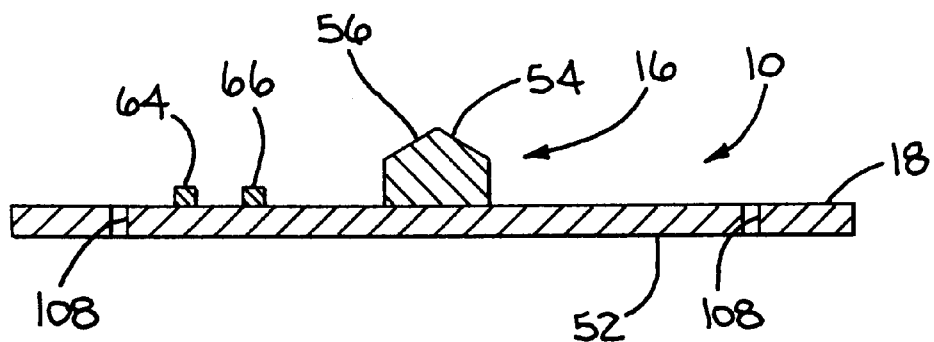
FIG. 2 is a cross-sectional view of a base for supporting the part of the inner mold assembly in FIG. 1.
Figure 6:
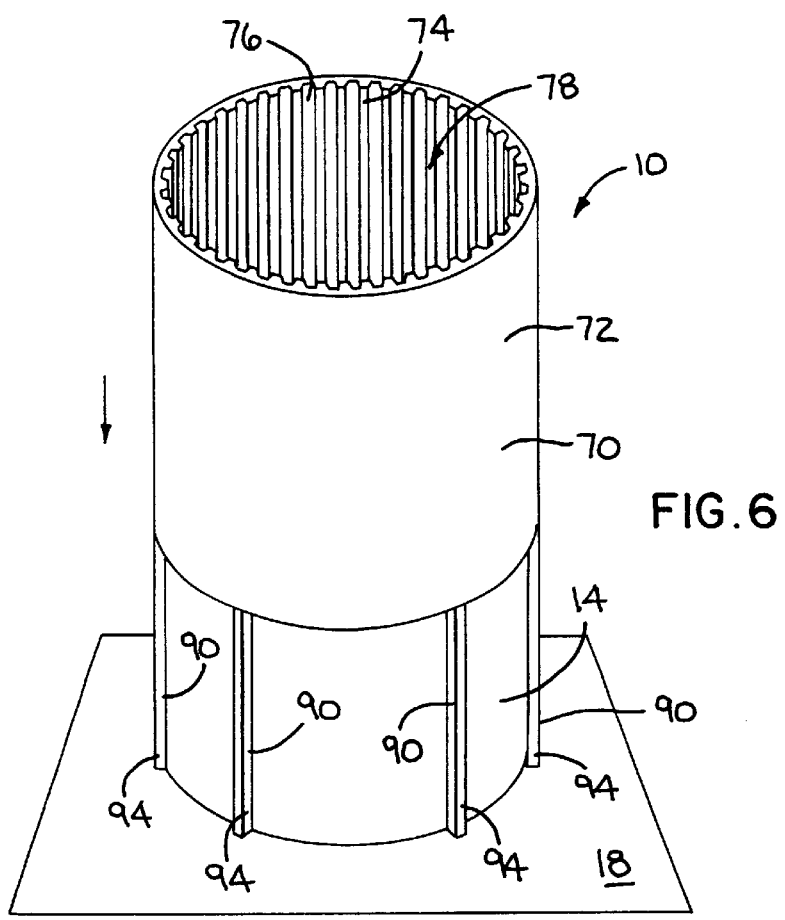
FIG. 6 is a view as in FIG. 3 showing an outer mold assembly being moved into operative relationship with the inner mold assembly.

As seen in FIGS. 1 and 3, a receptacle 58 and projection 62 can be provided on the top wall 102 with receptacles 104, 106 on the bottom wall 60 so that the cylindrical body 20 can be installed on the base 18 as shown or in the same fashion in an inverted orientation.

Once the desired relationship between the inner mold assembly 16 and outer mold assembly 70 is established, the guide elements 90 can be moved from the second position to the first position, i.e. be fully withdrawn and separated from the inner mold assembly 16 and outer mold assembly 70.

In a preferred form, the cross-sectional shape and size of the guide elements 90 are selected so that the vertical leg 94 of each guide element 90 resides substantially fully within a groove 76. Preferably, the vertical leg 94 of the guide element 90 is slightly smaller than the grooves 76. The cross section of the vertical leg 94 may be circular, oval, square, or other suitable shape.

Once the inner mold assembly 16 and outer mold assembly 70 are placed in a relative operative position, the guide elements 90 are separated from the inner mold assembly 16 and outer mold assembly 70. The inner mold assembly, outer mold assembly and sheet material 14 in operative relationship are then transferred to a vulcanizing station at which the sheet material 14 is vulcanized in a conventional manner. After vulcanization, the sheet material 14 is separated form the first mold assembly 16 and cut to predetermined widths to produce double-cogged/toothed belts 12.

As seen in FIG. 7, the resulting belt 12 has cogs/projections 80 on one side thereof that are regularly spaced and aligned in the lengthwise direction of the belt 12, as indicated by the double-headed arrow L, with regularly spaced projections/cogs 42 on the other side of the belt 12. Similarly, the grooves 82 between the cogs/projections 80 are aligned in a likewise direction with the grooves 41 between adjacent cogs/projections 42.

The invention can be constructed so that any relative position between the projections 42, 80 and grooves 41, 82 can be established.

The following test results demonstrate the effects of the present invention.

EXAMPLE 1, COMPARATIVE SAMPLE 1

Load carrying cords were prepared using non-processed cords having a total size of 6600 denier. The cords were produced by twisting polyethylene teraphthalate fibers of 1100 denier at 11.4 twists per 10 cm for the upper twist and at 21.0 twists per 10 cm for the lower twist with a twisting constitution of 2×3, with the upper and lower twists being in opposite directions.

The non-processed cords were pre-dipped in an isocyanate adhesive, then dried at 170–180° C. Thereafter they were dipped in RFL solution and fixed under tension at a temperature of 200–240° C.

The reinforcing fabric was a plain canvas fabric made of cotton spun yarns. The fabric was dipped in RFL and heated at 150° C. for two minutes to produce a processed canvas fabric. The processed canvas fabric was coated with a rubber composition under friction to form a rubber-coated canvas fabric.

The compression and tension sections of the belt were made from a rubber composition made up of chloroprene rubber with short aramid fibers therein. The cushion rubber layer was made from chloroprene rubber without fibers.

A sheet of the reinforcing fabric, an unvulcanized rubber sheet for the compression section, and an unvulcanized rubber sheet for the cushion rubber layer were laminated together, put on a flat mold having alternating grooves and projections on its surface, and pressed against the mold in an environment at a temperature of 80° C. A cog pad was thus produced.

The cog pad was wound around the inner mold assembly. Thereafter, load carrying cords and a flat extensible rubber layer and reinforcing fabric were wound over the cog pad to produce a sheet material/belt sleeve.

The belt sleeve was put on a base in a predetermined position and six guide elements were situated at regular intervals. An outer mold assembly was placed over the sheet material/belt sleeve utilizing the guide elements 90.

The guide elements 90 were then removed and an outer mold assembly was applied over the inner mold assembly. The sheet material was then vulcanized and cut into V-shaped raw-edge double-cogged belts.

The resulting belts had an upper width of 36.5 mm, a thickness of 16.5 mm, a length of 1310 mm, a depth for the upper cogs of 5.0 mm, and a depth of the lower cogs of 5.0 mm. The pitch of the upper and lower cogs was 10.7 mm. The difference in the position of the corresponding grooves between the upper cogs and lower cogs was at most 1.5 mm.

A comparative belt was formed using the same method described above but without the use of guide elements. With this method, the difference between the corresponding grooves on opposite sides of the belt varied from 1.5 to 4 mm.

The foregoing disclosure of specific embodiments is intended to be illustrative of the broad concepts comprehended by the invention.

What is claimed is:

1. In combination:
    a first mold assembly having a central axis, a circumference, and a plurality of keying elements;
    a sheet material having first and second oppositely facing surfaces,
    there being a plurality of alternating grooves and projections on each of the first and second oppositely facing surfaces of the sheet material,
    wherein the sheet material extends around the first mold assembly and the keying elements on the first mold assembly and grooves and projections on the sheet material cooperate to maintain the sheet material and first mold assembly in a predetermined circumferential position relative to each other with the sheet material and first mold assembly in operative relationship;
    a second mold assembly having a surface with a plurality of alternating grooves and projections thereon; and
    a guide element in axial coincidence with the surface of the second mold assembly and operatively connecting between the first and second mold assemblies to maintain the first and second mold assemblies in a predetermined circumferential position relative to each other.

2. The combination according to claim 1 wherein the keying elements comprise alternating grooves and projections.

3. The combination according to claim 2 wherein the grooves and projections on the first and second mold assemblies and sheet material extend over substantially the full axial extent of the sheet material.

4. The combination according to claim 1 wherein the sheet material has a body comprising at least one rubber layer and elongate load carrying cords embedded in the body.

5. The combination according to claim 1 wherein there are a plurality of guide elements each operatively connecting between the first and second mold assemblies to maintain the first and second mold assemblies in the predetermined circumferential position relative to each other, there being a first one of the guide elements that is selectively separable from each of the first and second mold assemblies.

6. The combination according to claim 1 wherein the second mold assembly extends around the central axis.

7. The combination according to claim 1 wherein there are a plurality of guide elements operatively connecting between the first and second mold assemblies to maintain the first and second mold assemblies in a predetermined circumferential position relative to each other.

8. In combination:
a first mold assembly having a central axis, a circumference, and a plurality of keying elements;
a sheet material having first and second oppositely facing surfaces,
there being a plurality of alternating grooves and projections on each of the first and second oppositely facing surfaces of the sheet material,
wherein the sheet material extends around the first mold assembly and the keying elements on the first mold assembly and grooves and projections on the sheet material cooperate to maintain the sheet material and first mold assembly in a predetermined circumferential position relative to each other with the sheet material and first mold assembly in operative relationship;
a second mold assembly having a surface with a plurality of alternating grooves and projections thereon; and
a guide element operatively connecting between the first and second mold assemblies to maintain the first and second mold assemblies in a predetermined circumferential position relative to each other,
wherein the guide element is fixed against circumferential movement relative to the first mold assembly and is repositionable between a) a first position wherein a part of the guide element resides in one of the grooves in the second mold assembly and b) a second position wherein the part of the guide element does not reside within the one groove.

9. In combination:
a first mold assembly having a central axis, a circumference, and a plurality of keying elements;
a sheet material having first and second oppositely facing surfaces,
there being a plurality of alternating grooves and projections on each of the first and second oppositely facing surfaces of the sheet material,
wherein the sheet material extends around the first mold assembly and the keying elements on the first mold assembly and grooves and projections on the sheet material cooperate to maintain the sheet material and first mold assembly in a predetermined circumferential position relative to each other with the sheet material and first mold assembly in operative relationship;
a second mold assembly having a surface with a plurality of alternating grooves and projections thereon; and
a guide element operatively connecting between the first and second mold assemblies to maintain the first and second mold assemblies in a predetermined circumferential position relative to each other,
wherein the first mold assembly comprises a base with a first wall having a first upwardly facing surface and a cylindrical body with a second wall with a second upwardly facing surface above the first upwardly facing surface, there being a main projection on one of the base and cylindrical body and a receptacle for the main projection on the other of the base and cylindrical body, and the guide element is engaged with each of the first and second walls.

10. The combination according to claim 9 wherein there is a first positioning projection on one of the first wall and the guide element and a first receptacle for the first positioning projection on the other of the first wall and the guide element and a second positioning projection on one of the second wall and the guide element and a second receptacle for the second positioning projection on one of the second wall and the guide element, the first and second positioning projections being extendable into the first and second receptacles as an incident of the guide element being moved axially with respect to the central axis relative to the first mold assembly.

11. The combination according to claim 10 including projections in each of the base and cylindrical body which are offset radially from the central axis and cooperate with each other to maintain the base and cylindrical body in a predetermined relative position.

12. The combination according to claim 10 wherein the grooves in the second mold element extend substantially parallel to the central axis and the guide element has an elongate part that projects axially relative to the central axis within one of the grooves in the second mold assembly.

13. The combination according to claim 10 wherein there is a third positioning projection on one of the second wall and the guide element and a third receptacle for the third positioning receptacle on one of the second wall and the guide element.

14. The combination according to claim 13 wherein the guide element has an L-shaped body with a horizontal leg and a vertical leg, the first and third projections are in the horizontal leg and the second projection is on the vertical leg.

15. The combination according to claim 14 wherein there are a plurality of receptacles on the base and cylindrical body for receiving the first, second and third projections with the guide element in each of a plurality of different positions relative to the first mold assembly.

16. The combination according to claim 14 wherein the grooves in the second mold element extend substantially parallel to the central axis and the vertical leg of the guide element resides within one of the grooves in the second mold assembly.

* * * * *